(12) United States Patent
Pidutti et al.

(10) Patent No.: US 9,130,451 B2
(45) Date of Patent: Sep. 8, 2015

(54) CIRCUITRY, MULTI-BRANCH CHARGE PUMP, METHOD FOR CONTROLLING A CHARGE PUMP AND SYSTEM

(71) Applicant: Infineon Technologies AG, Neubiberg (DE)

(72) Inventors: Albino Pidutti, Martignacco (AT); Bernhard Sorger, Lieserbruecke (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/320,299

(22) Filed: Jun. 30, 2014

(65) Prior Publication Data
US 2015/0015324 A1   Jan. 15, 2015

(30) Foreign Application Priority Data
Jul. 15, 2013   (EP) .................................... 13176466

(51) Int. Cl.
*H02M 3/07* (2006.01)
(52) U.S. Cl.
CPC ................. *H02M 3/07* (2013.01); *H02M 3/073* (2013.01)
(58) Field of Classification Search
CPC ................................. H02M 3/07; H02M 3/073
USPC ............................................................. 327/536
See application file for complete search history.

(56) References Cited

U.S. PATENT DOCUMENTS

| 5,258,662 | A |   | 11/1993 | Skovmand |
|---|---|---|---|---|
| RE35,121 | E | * | 12/1995 | Olivo et al. ...................... 363/60 |
| 5,734,286 | A | * | 3/1998 | Takeyama et al. ............. 327/295 |
| 5,774,012 | A |   | 6/1998 | Im |
| 5,793,246 | A | * | 8/1998 | Vest et al. ...................... 327/536 |
| 5,818,766 | A | * | 10/1998 | Song ......................... 365/189.11 |
| 6,026,002 | A | * | 2/2000 | Viehmann ........................ 363/60 |
| 6,163,205 | A | * | 12/2000 | Fiedler et al. .................. 327/536 |
| 6,236,260 | B1 | * | 5/2001 | Vest et al. ...................... 327/536 |
| 6,891,764 | B2 | * | 5/2005 | Li ............................. 365/189.15 |
| 6,909,335 | B2 | * | 6/2005 | Bae ................................. 331/135 |
| 7,342,438 | B2 | * | 3/2008 | Muneer et al. ................. 327/536 |
| 2001/0002881 | A1 | * | 6/2001 | Rapp ................................ 363/59 |
| 2006/0220728 | A1 | * | 10/2006 | Chun ............................. 327/536 |
| 2007/0096796 | A1 |   | 5/2007 | Firmansyah et al. |

FOREIGN PATENT DOCUMENTS

EP       2538534 A1    12/2012
JP       2011062006 A    3/2011

OTHER PUBLICATIONS

Extended Search Report from counterpart European application No. 13176466.4, dated Nov. 26, 2013, 8 pp.

* cited by examiner

*Primary Examiner* — Thomas J Hiltunen
(74) *Attorney, Agent, or Firm* — Shumaker & Sieffert, P.A.

(57) ABSTRACT

One example refers to a circuitry comprising a first charge pump stage controlled by a first control signal, a second charge pump stage controlled by a second control signal, wherein the first charge pump stage and the second charge pump stage are arranged subsequently to each other and comprising a control unit for providing the first control signal and the second control signal, wherein the control unit is arranged to set the second control signal to high when the first control signal is high. Also, a multi-branch charge pump, a method for controlling various charge pumps and a system for controlling various charge pumps are suggested.

18 Claims, 13 Drawing Sheets

Fig.13 ary pages).

CIRCUITRY, MULTI-BRANCH CHARGE PUMP, METHOD FOR CONTROLLING A CHARGE PUMP AND SYSTEM

This application claims priority to European Application Serial No. 13176466.4, filed on Jul. 15, 2013, the entire content of which is incorporated by reference herein.

The invention relates to a circuitry, in particular a multi-stage charge pump. Also, a multi-branch charge pump, a method for controlling various charge pumps and a system for controlling various charge pumps are suggested.

Semiconductor charge pump valves can be designed by using the parasitic bipolar structure of a HVNMOS transistor (HVNMOS: high voltage n-type metal-oxide semiconductor) or by using directly the HVNMOS transistors as electronic switches, also referred to as valves. This applies in particular to pump valves that are designed in SMART technology which in particular refers to a semiconductor device having a vertical DMOS structure with low output impedance.

Details with regard to SMART technology can be found in [Bruno Murari, et al. (ed.): "Smart Power ICs: Technologies and Applications", Springer-Verlag 2002] and under http://books.google.at/books?id=RARwgdmuHyQC&printsec=frontcover&dq=B.+murari&hl=de&sa=X&ei=ore5UdCSKYmFhQfnnoDQCg&ved=0CDAQ6AEwAA.

Figure 1:
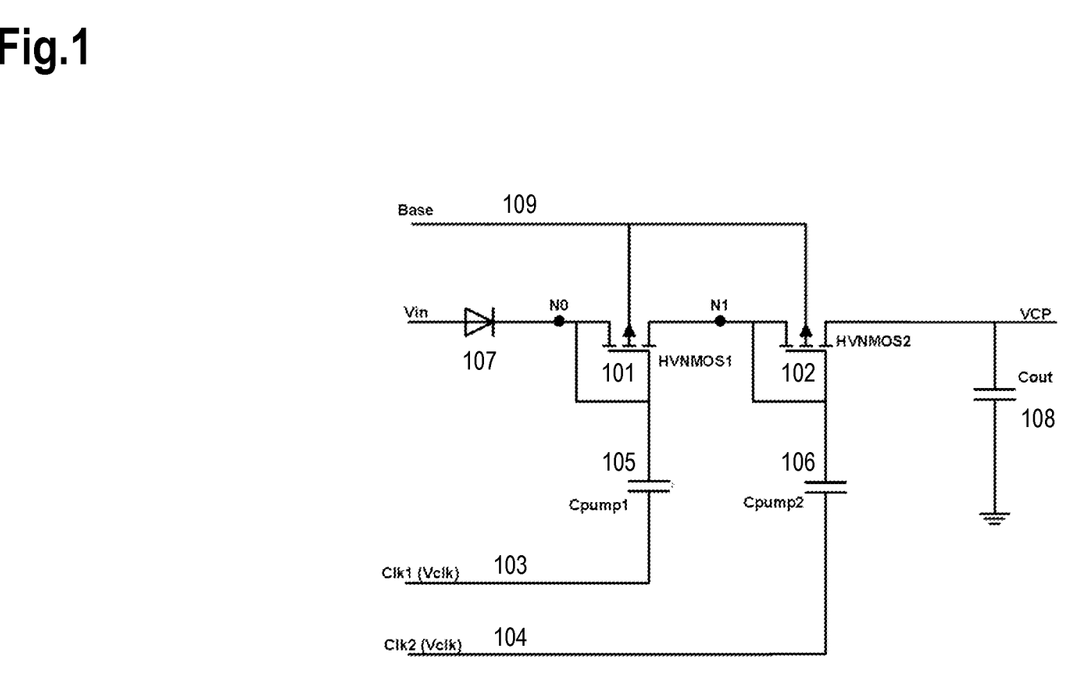
FIG. 1 shows a schematic of a charge pump with HVN-MOS transistors.

FIG. 1 shows a schematic of a charge pump with HVNMOS transistors 101 and 102. A clock signal 103 is fed via a capacitor 105 to the gate of the HVNMOS transistor 101. A clock signal 104 is fed via a capacitor 106 to the gate of the HVNMOS transistor 102. The source of the HVNMOS transistor 101 is connected to a node N1 and the drain of the HVNMOS transistor 101 is connected to a node N0. The node N0 is connected via a diode 107 to an input signal Vin, wherein the cathode of the diode 107 points towards the node N0.

The drain of the HVNMOS transistor 102 is connected to the node N1 and the source of the HVNMOS transistor 102 provides a signal VCP (voltage of the charge pump), wherein the source of the HVNMOS transistor 102 is also connected to ground via a capacitor 108.

The HVNMOS transistor 101 and the HVNMOS transistor 102 each comprise a substrate connection, which is combined to a common base connection 109. Also, the gate of the HVNMOS transistor 101 is connected with its drain; accordingly, the gate of the HVNMOS transistor 102 is connected with its drain.

Figure 2:
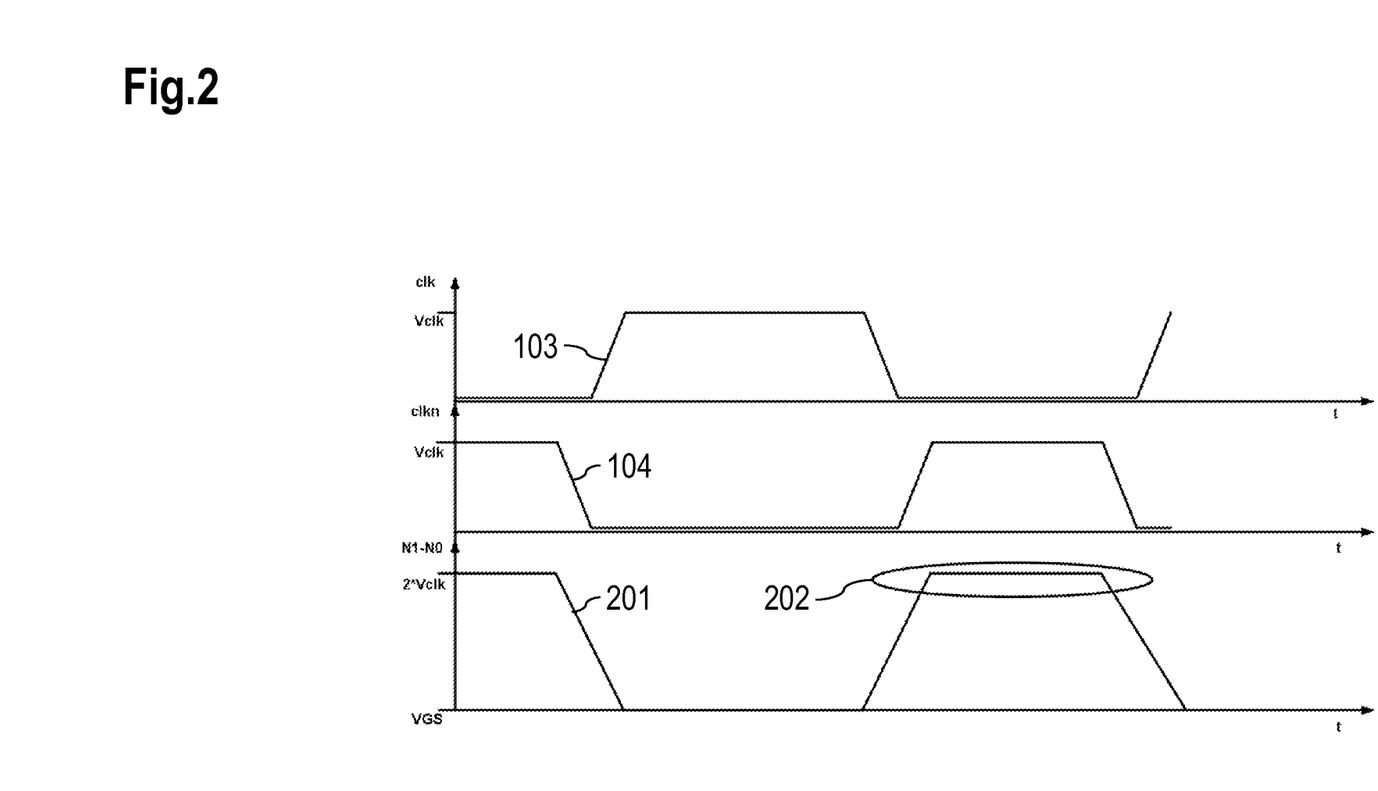
FIG. 2 shows a schematic diagram of a clock voltage characteristic comprising a first clock signal and a second clock signal.

FIG. 2 shows a schematic diagram of a clock voltage characteristic comprising the clock signal 103 and the clock signal 104. A signal 201 visualizes the voltage drop between the nodes N1 and N0, which amount to twice the voltage of the clock signal 103 or 104 during, e.g., a period 202. Hence, the voltage drop over the HVNMOS transistor 101 is significantly higher than the voltage of the clock signal 103 applied to its gate.

In the charge pump shown in FIG. 1, the HVNMOS transistor 101 is required, because a voltage difference between the node N0 and the node N1 reaches two times the clock voltage, which would be too high for a common bipolar transistor.

Further disadvantages of the parasitic bipolar implementation are the additional circuitry which is required to bias the base (area), the size of the HVNMOS (area) required, the voltage loss of the drain-source region and the high gate-source voltage loss which heavily impact the efficiency of the overall circuit.

One problem to be solved is to provide a more efficient solution that may in particular allow using less expensive and more common bipolar transistors as electronic switches (valves) of a charge pump arrangement.

This problem is solved according to the features of the independent claims. Further embodiments result from the depending claims.

In order to overcome this problem, a circuitry is suggested comprising
  a first charge pump stage controlled by a first control signal,
  a second charge pump stage controlled by a second control signal,
    wherein the first charge pump stage and the second charge pump stage are arranged subsequently to each other
  a control unit for providing the first control signal and the second control signal, wherein the control unit is arranged to set the second control signal to high when the first control signal is high.

The first charge pump stage and the second charge pump stage may be arranged in series to each other. The control signal for driving a charge pump stage can also be referred to as clock signal. It is noted that more than two charge pump stages can be arranged according to this scheme, wherein a control signal of a subsequent charge pump stage is preferably only set to high during the high-period of the control signal of the previous control signal. The order of charge pump stages may stem from the fact that they are arranged directly or indirectly in series in relation to an input signal (adjacent to the first charge pump of the series) towards an output signal (adjacent to the last charge pump of the series).

It is noted that the above may also be referred to as a 2-stage charge pump. However—as indicated—charge pumps with more than two stages can be realized accordingly.

Hence, it is avoided that the second control signal is high when the first control signal is low. In other words, the second control signal is only high when the first control signal is high.

It is further noted that "high" refers to a given voltage other than zero. It may in particular be a voltage useful for activating the first or second charge pump. In particular, the opposite "low" may be used to introduce a different voltage other than high for the control signal to be set to. Setting to high may also indicate that a signal is applied and setting to low may indicate a phase with no signal being applied.

Hence, the voltage drop over the semiconductor switch of the charge pump stage (also referred to as charge pump valve) is significantly reduced, which allows implementing common bipolar transistors instead of expensive high voltage transistors such as, e.g., HVNMOS transistors.

With the provided solution the voltage drop across the valves in a charge pump design can be reduced. This enables using common bipolar transistors in a diode configuration (i.e. the base and the collector connected together as one connection and the emitter as the other connection) in charge pump designs used, e.g., in SMART technologies.

It is noted that the second control signal can be set to high when the first control signal is high may include that the second control signal is switched to high for a shorter period of time compared to the duration the first control signal is set to high. The second control signal may be set to high after the first control signal reached its high voltage. Also, the second control signal may have reached its low state before the first control signal reaches its low state. The duration for the second control signal to be set to high may be in the middle of the duration the first control signal is set to high. The duration of the first signal being high may in particular be longer than the second signal being set to high.

In an embodiment, the first charge pump stage and the second charge pump stage are arranged subsequently to each other,
- wherein an input signal is directly or indirectly fed to the first charge pump stage
- and via the first charge pump stage directly or indirectly conveyed to the second charge pump stage.

In another embodiment, the first charge pump stage and the second charge pump stage each comprises
- a semiconductor element which is driven by the control signal of the respective stage, which is conveyed to the semiconductor element via a capacitor.

The capacitor may be any element with capacitive characteristics. In particular combinations of elements could be used to provide a capacity that could be utilized in a charge pump stage.

In a further embodiment, the semiconductor element comprises at least one of the following:
- a transistor,
- a diode,
- a bipolar transistor,
- a MOSFET,
- a HVMOS transistor,
- an IGBT,
- a field-effect transistor.

In another embodiment, the control unit comprises an oscillator and an oscillator logic.

It is also an embodiment that the oscillator is a current-source-capacitor oscillator comprising
- a Schmitt trigger connected to a first inverter,
- a second inverter,
- a capacitor,
- two current sources providing an output signal for charging and discharging the capacitor, wherein the output signal is fed to the Schmitt trigger and to the second inverter,
- wherein the Schmitt trigger drives via the first inverter the two current sources and provides a first intermediate signal,
- wherein the second inverter provides a second intermediate signal.

Pursuant to another embodiment, the first intermediate signal and the second intermediate signal are 90-degree phase shifted and are combined by the oscillator logic to provide the first control signal and the second control signal.

According to an embodiment, the circuitry is a charge pump or a portion of a multi-branch charge pump.

The problem stated above is also solved by a multi-branch charge pump
- comprising at least two multi-stage charge pump cores, each of the charge pump cores comprising
  - a first charge pump stage controlled by a first control signal,
  - a second charge pump stage controlled by a second control signal,
  - wherein the first charge pump stage and the second charge pump stage are arranged subsequently to each other,
  - a control unit for providing the first control signal and the second control signal for each of the charge pump cores,
  - wherein the control unit is arranged to set for each charge pump core the second control signal to high when the first control signal is high.

According to an embodiment, the control unit provides several control signals, which are phase shifted by a predetermined amount, wherein two adjacent control signals are provided as first and second control signals to each of the charge pump cores.

According to another embodiment, the outputs of the charge pump cores are combined in a combined voltage output signal.

The problem indicated above is also solved by a method for controlling a charge pump, wherein the charge pump comprises a first charge pump stage controlled by a first control signal and a second charge pump stage controlled by a second control signal, wherein the first charge pump stage and the second charge pump stage are arranged subsequently to each other, comprising the step:
- setting the second control signal to high when the first control signal is set high.

According to an embodiment, the method comprises the step:
- setting the second control signal to high for a second duration while the control signal is set to high for a first duration.

According to a further embodiment, the first duration is longer than the second duration.

It is also an embodiment that the middle of the first duration and the middle of the second duration occur at substantially the same time.

Hence, both the first and second duration of the high phase are centered to each other, wherein the second duration may be shorter than the first duration.

In addition, the problem is solved by a system for controlling a charge pump,
- wherein the charge pump comprises a first charge pump stage controlled by a first control signal and a second charge pump stage controlled by a second control signal, wherein the first charge pump stage and the second charge pump stage are arranged subsequently to each other,
- comprising means for setting the second control signal to high when the first control signal is (or was set) to set high.

Examples are shown and illustrated with reference to the drawings. The drawings serve to illustrate the basic principle, so that only aspects necessary for understanding the basic principle are illustrated. The drawings are not to scale. In the drawings the same reference characters denote like features.

With the solution presented, a clocking sequence may be generated which reduces the voltage drop at the reverse biased base-emitter diode of a transistor. Hence advantageously common standard bipolar transistors can be used instead of HVNMOS transistors in a charge pump design of high side switches. It is another advantage that the device itself requires a reduced area on the chip and that further space can be saved, because the base biasing circuitry may be omitted, which would otherwise be required for HVNMOS devices. Also the charge pump efficiency can be increased due to the reduction of high voltage MOS voltage losses ($V_{GS}$, $V_{DS}$, parasitic VBE (voltage across base and emitter)) to one VBE.

Figure 3:
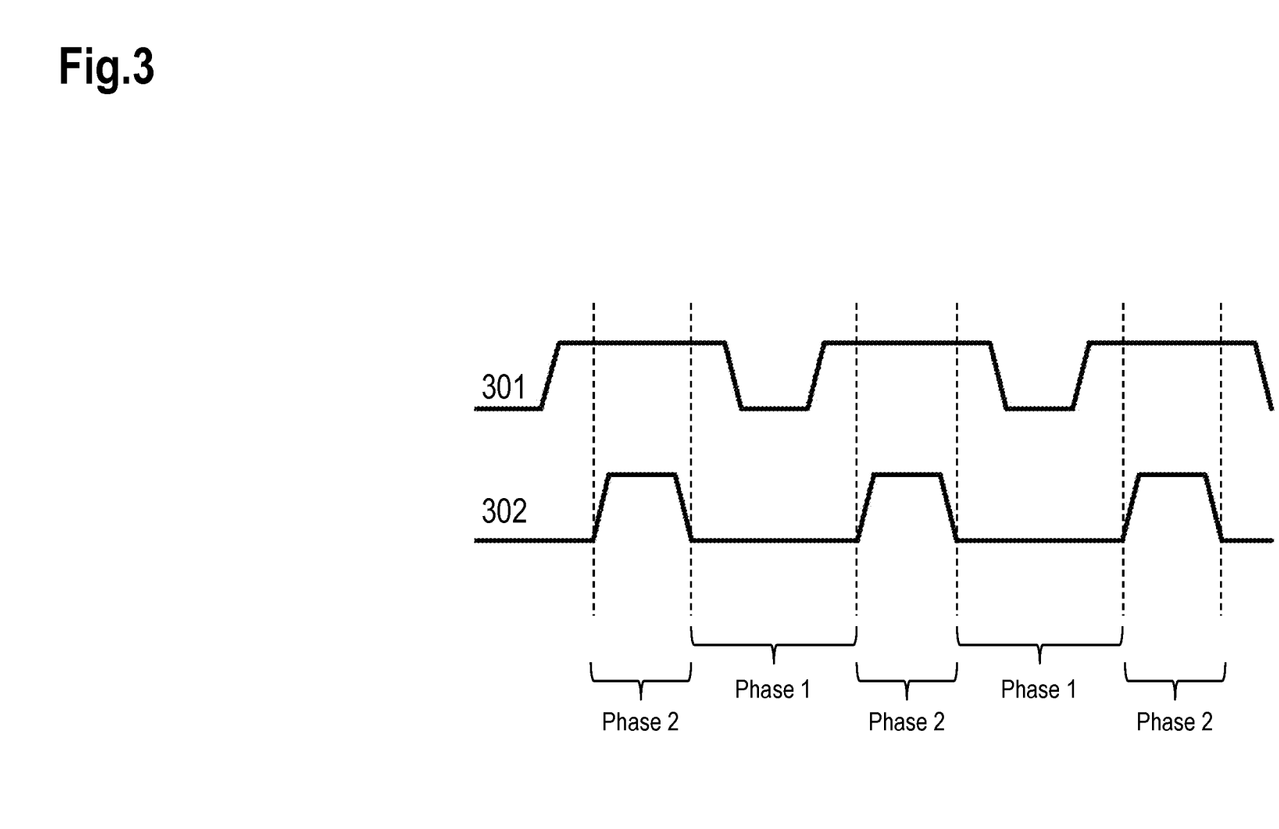
FIG. 3 shows a clocking sequence comprising an overlapping scheme of the single clock signals.

FIG. 3 shows a clocking sequence comprising an overlapping scheme of the single clock signals. Hence, a clock signal 301 and a clock signal 302 are shown, wherein during an on-period of the clock signal 301 also the clock signal 302 is switched on and switched off. Hence the on-periods of the clock signals 301 and 302 overlap. The same applies for the off-phases of the clock signals 301 and 302.

This allows limiting the maximum voltage drop at a reverse biased base-emitter diode. Another advantage is the possibility to realize a multi-branch charge pump.

Hence, the voltage drop at the charge pump valves, i.e. the semiconductor switches, can be reduced. This is achieved by avoiding a clock signal condition with the clock signal 302 for the second charge pump valve being high when the clock signal 301 for the first charge pump valve is low. In other words, the clock signal 302 is only high when the clock signal 301 is high.

This allows limiting the voltage drop over the first charge pump valve from two-times the clock voltage to a level which allows using standard bipolar devices as charge pump valves, without violating the maximum condition for the reverse base-emitter breakthrough voltage.

Figure 4:
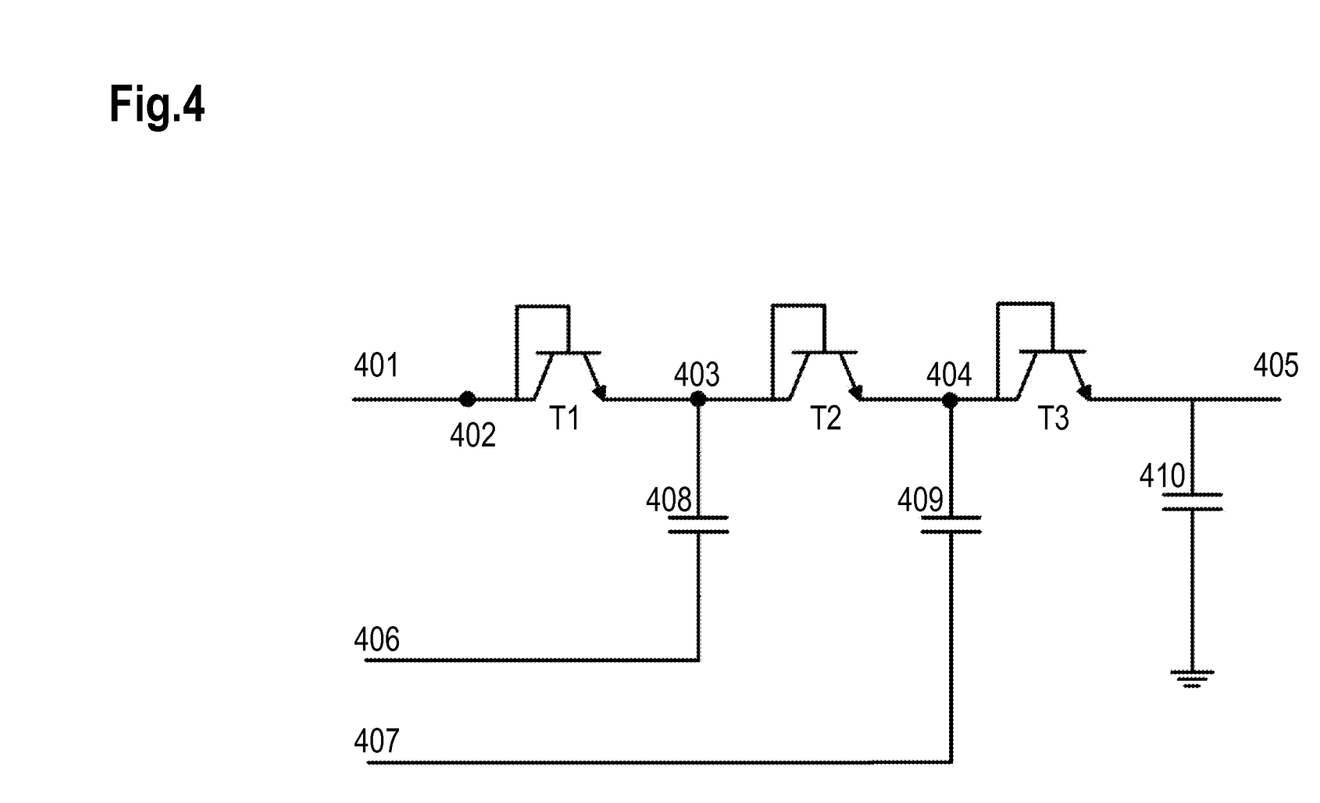
FIG. 4 shows an exemplary implementation of a charge pump comprising npn bipolar transistors.

FIG. 4 shows an exemplary implementation of a charge pump comprising npn bipolar transistors T1, T2 and T3.

An input signal 401 is fed to a node 402. The node 402 is connected with the collector and the base of the transistor T1. The emitter of the transistor T1 is connected to a node 403. The node 403 is connected with the collector and the base of the transistor T2. The emitter of the transistor T2 is connected to a node 404. The node 404 is connected with the collector and the base of the transistor T3. The emitter of the transistor T3 is connected via a capacitor 410 to ground. Also, an output signal 405 (e.g. VCP) is supplied via the emitter of the transistor T3.

A clock signal 406 is supplied via a capacitor 405 to the node 403 and a clock signal 407 is supplied via a capacitor 409 to the node 404.

Figure 5:
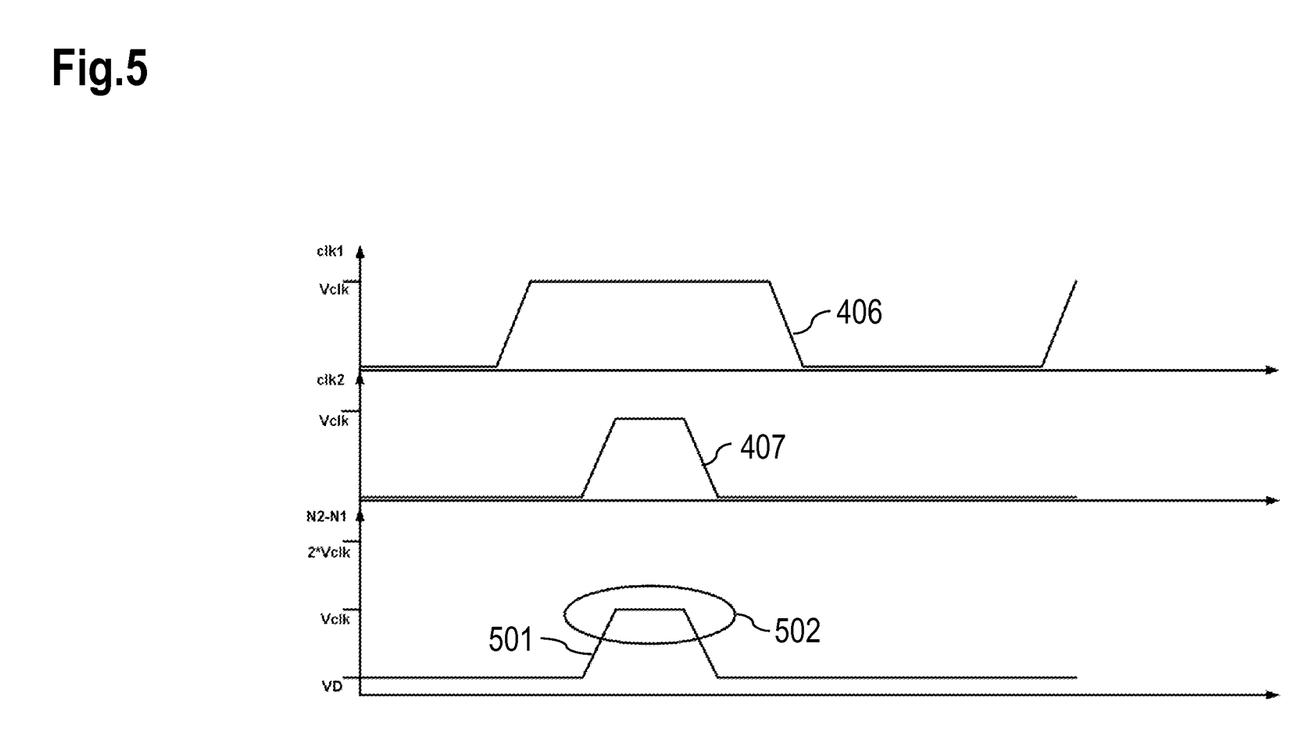
FIG. 5 shows a diagram visualizing voltage transients of a fully overlapping clocking sequence comprising the clock signals of the circuit according to FIG. 4.

FIG. 5 shows a diagram visualizing voltage transients of a fully overlapping clocking sequence comprising the clock signals 406 and 407 of the circuit according to FIG. 4. A signal 501 shows a voltage drop over the transistor T2. The maximum voltage drop 502 amounts to one time the clock voltage (which in this example is assumed to have the same value "Vclk" for both clock signals 406 and 407).

When clock signal 406 is high (phase 1 in FIG. 3) the node 403 is charged to $V\text{in}+(V\text{clk}-VD)$, wherein Vin is the voltage of the input signal 401, Vclk is the voltage of the clock signal 406 (also the same amount of voltage applies for the clock signal 407) and VD is the voltage drop across the base-emitter diode for each of the transistors, here the transistor T1. Accordingly, the node 404 reaches a voltage amounting to $V\text{in}+(V\text{clk}-2*VD)$.

If the clock signal 407 is high when the clock signal 406 is still high (phase 2 in FIG. 3) the voltage at the node 404 amounts to $V\text{in}+(2*V\text{clk}-2*VD)$ so the Voltage drop at the transistor T2 amounts to Vclk.

The overlapping clocking scheme as shown in FIG. 3 can be generated with a current-source-capacitor based oscillator (CSC oscillator) and additional logic (also referred to as oscillator logic).

Figure 6:
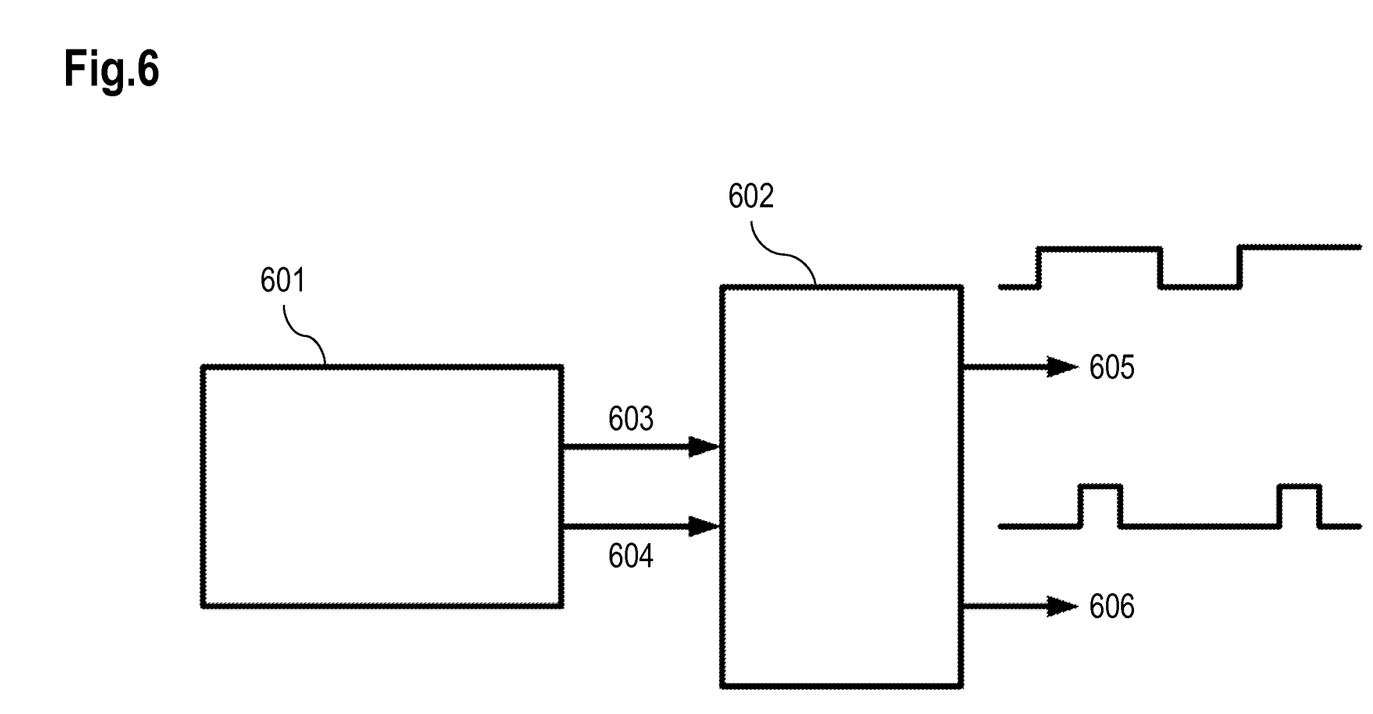
FIG. 6 shows a block diagram of an oscillator circuitry comprising a CSC oscillator and an oscillator logic.

FIG. 6 shows a block diagram of an oscillator circuitry comprising a CSC oscillator 601 and an oscillator logic 602, wherein the CSC oscillator 601 conveys a clock signal 603 and a clock signal 604 to the oscillator logic 602, which produces a clock signal 605 and a clock signal 606. The CSC oscillator 601 and the oscillator logic 602 are described hereinafter in more detail.

CSC-Oscillator

Figure 7:
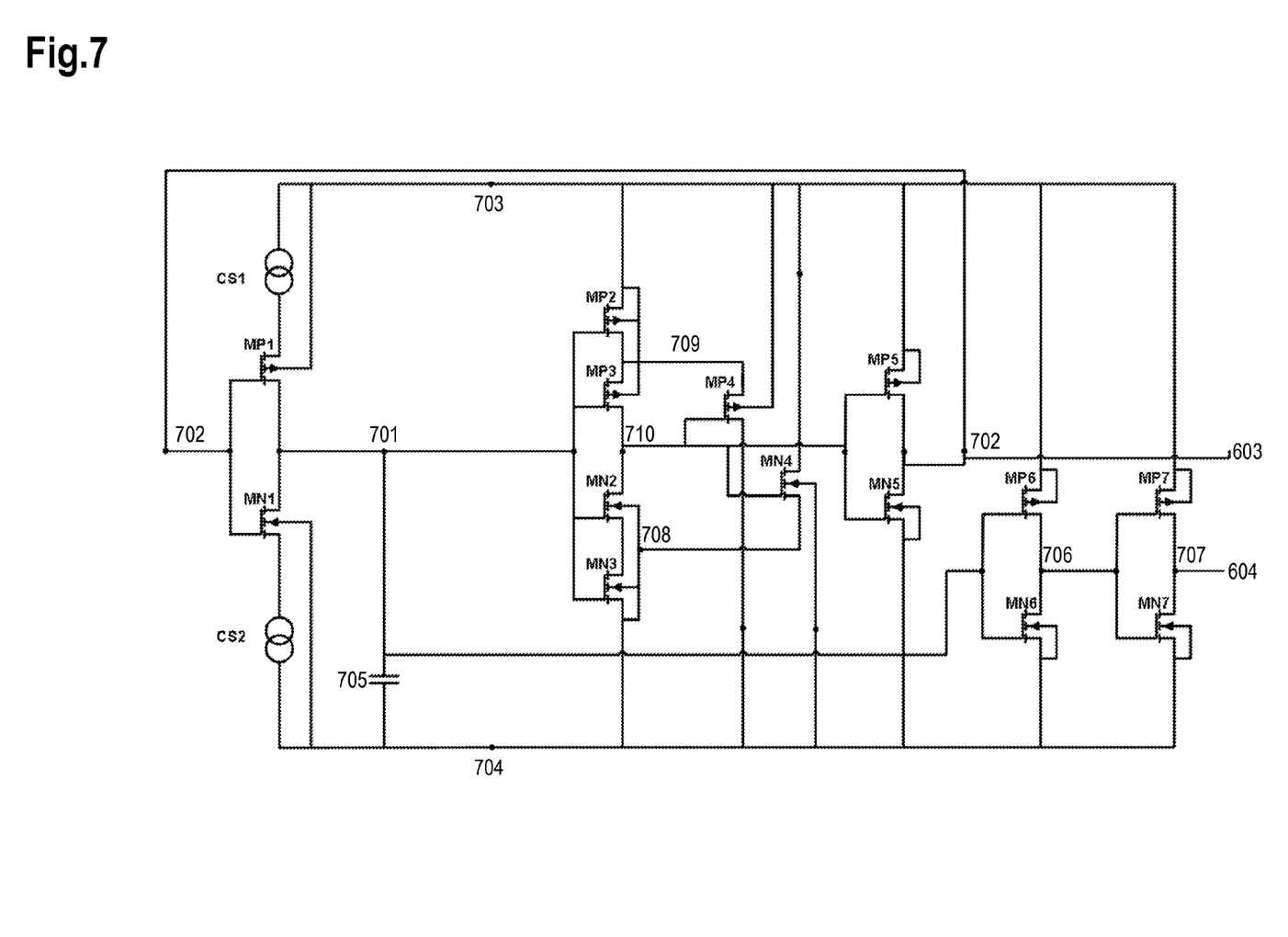
FIG. 7 shows an exemplary schematic diagram of a CSC oscillator as depicted in FIG. 6.

FIG. 7 shows a schematic diagram of the CSC oscillator 601. FIG. 7 comprises several p-channel MOSFETs MP1 to MP7 and several n-channel MOSFETs MN1 to MN7.

A node 702 is connected to the gate of the MOSFET MP1 and to the gate of the MOSFET MN1. The clock signal 603 is provided via the node 702.

The drain of the MOSFET MP1 is connected via a current source SC1 to a node 703. The bulk of the MOSFET MP1 is connected to the node 703. The source of the MOSFET MN1 is connected via a current source SC2 to a node 704. The bulk of the MOSFET MN1 is connected to the node 704.

The source of the MOSFET MP1 is connected to a node 701 and the drain of the MOSFET MN1 is connected to the node 701.

The node 701 is connected via a capacitor 705 to the node 704. The node 701 is connected to the gate of the MOSFET MP6 and to the gate of the MOSFET MN6. The source and the bulk of the MOSFET MN6 are connected to the node 704. The drain of the MOSFET MN6 is connected to a node 706. The source of the MOSFET MP6 is connected to the node 706. The drain and the bulk of the MOSFET MP6 are connected to the node 703.

The node 706 is connected to the gate of the MOSFET MP7 and to the gate of the MOSFET MN7. The source and the bulk of the MOSFET MN7 are connected to the node 704. The drain and the bulk of the MOSFET MP7 are connected to the node 703. The source of the MOSFET MP7 is connected to a node 707 and the drain of the MOSFET MN7 is connected to the node 707. The clock signal 604 is provided via the node 707.

The node 701 is connected to the gates of the MOSFETs MP2, MP3, MN2 and MN3. The drain and the bulk of the MOSFET MP2 and the bulk of the MOSFET MP3 are connected to the node 703. The source of the MOSFET MP2 and the drain of the MOSFET MP3 are connected to a node 709. The node 709 is connected to the drain of the MOSFET MP4. The source of the MOSFET MP3 and the drain of the MOSFET MN2 are connected to a node 710.

The source of the MOSFET MN2 is connected to the drain of the MOSFET MN3. The bulk of the MOSFET MN2 is connected to a node 708. The bulk and the source of the MOSFET MN3 are connected to the node 708. The node 708 is also connected to the node 704. The node 708 is connected to the source of the MOSFET MN4.

The node 710 is connected to the gate of the MOSFET MP4 and to the gate of the MOSFET MN4. The node 710 is further connected to the gate of the MOSFET MP5 and to the gate of the MOSFET MN5.

The bulk and the source of the MOSFET MN5 are connected to the node 704. The bulk and the drain of the MOSFET MP5 are connected to the node 703. The source of the MOSFET MP5 is connected to the node 702 and the drain of the MOSFET MN5 is connected to the node 702.

The source of the MOSFET MP4 is connected to the node 704. The bulk of the MOSFET MP4 is connected to the node 703.

The bulk of the MOSFET MN4 is connected to the node 704. The drain of the MOSFET MN4 is connected to the node 703.

The current sources CS1 and CS2 charge and discharge the capacitor 705. The transistors MP1 and MN1 act as switches controlling the charging or discharging phase of the capacitor 705 and are switched according to the output signal 603.

Figure 8:
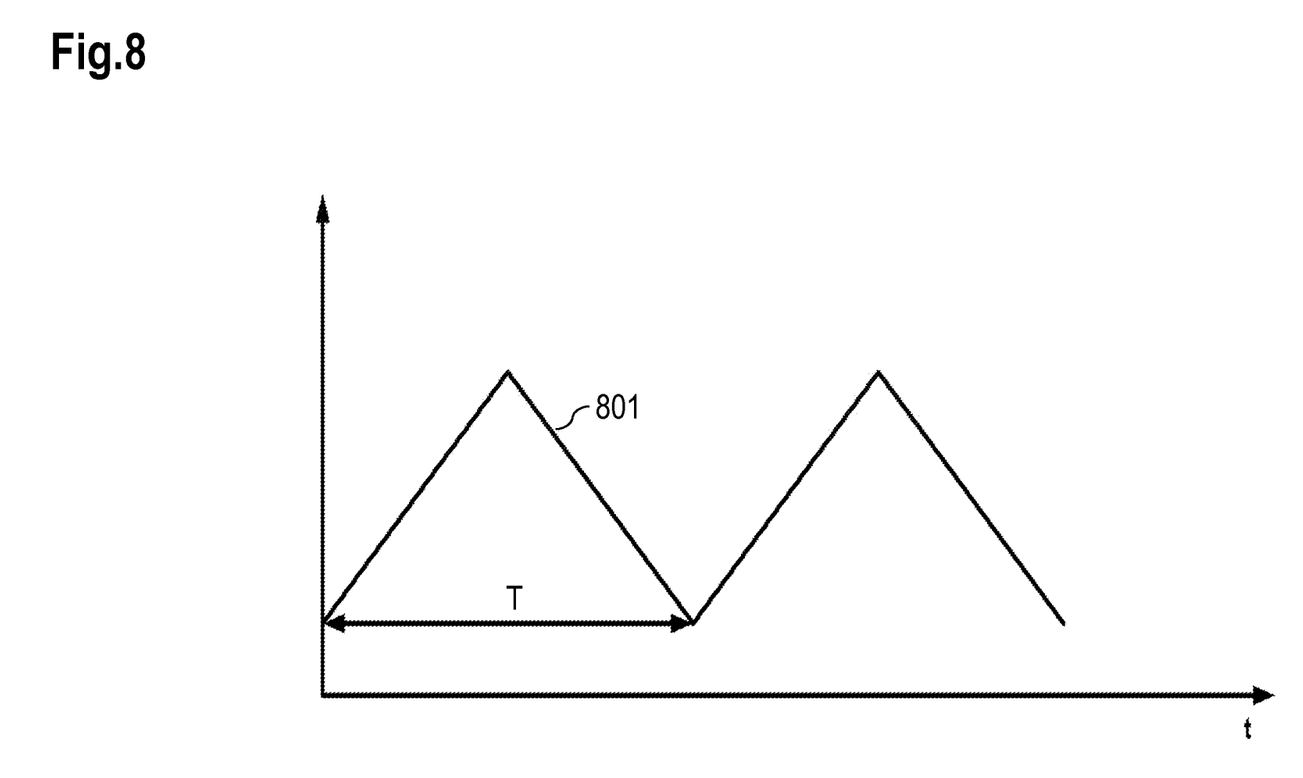
FIG. 8 shows a resulting voltage transient at an entry of the Schmitt trigger and the balanced inverters of FIG. 7.

Preferably, the current sources CS1 and CS2, the switches MP1 and MN1 and the capacitor 705 are dimensioned to realize a maximum admissible frequency (which may be limited by the available or utilized technology). FIG. 8 shows a resulting voltage transient 801 at a node 701.

The transistors MP2, MP3, MN2, MN3, MP4 and MN4 are connected in a Schmitt trigger configuration. A threshold voltage of the Schmitt trigger is defined by the transistor geometries of MP2, MP3, MN2, MN3, MP4 and MN4. A subsequent inverter comprising the transistors MP5 and MN5 provides an inversion of the Schmitt trigger signal and supplies the inverted signal 603. Said signal 603 controls the charging and discharging phase of the CSC-element and buffers the Schmitt trigger circuit.

If a load is directly connected to the Schmitt trigger, parasitic resistive and capacitive elements of the load will influence its functionality. The transistors MP6, MN6, MP7 and MN7 form two in series connected balanced inverters. The first inverter comprising the transistors MP6 and MN6 is directly connected to the node 701. The inverters provide switching at the middle of the transition of the charging and discharging phase from the CSC element.

Figure 9:
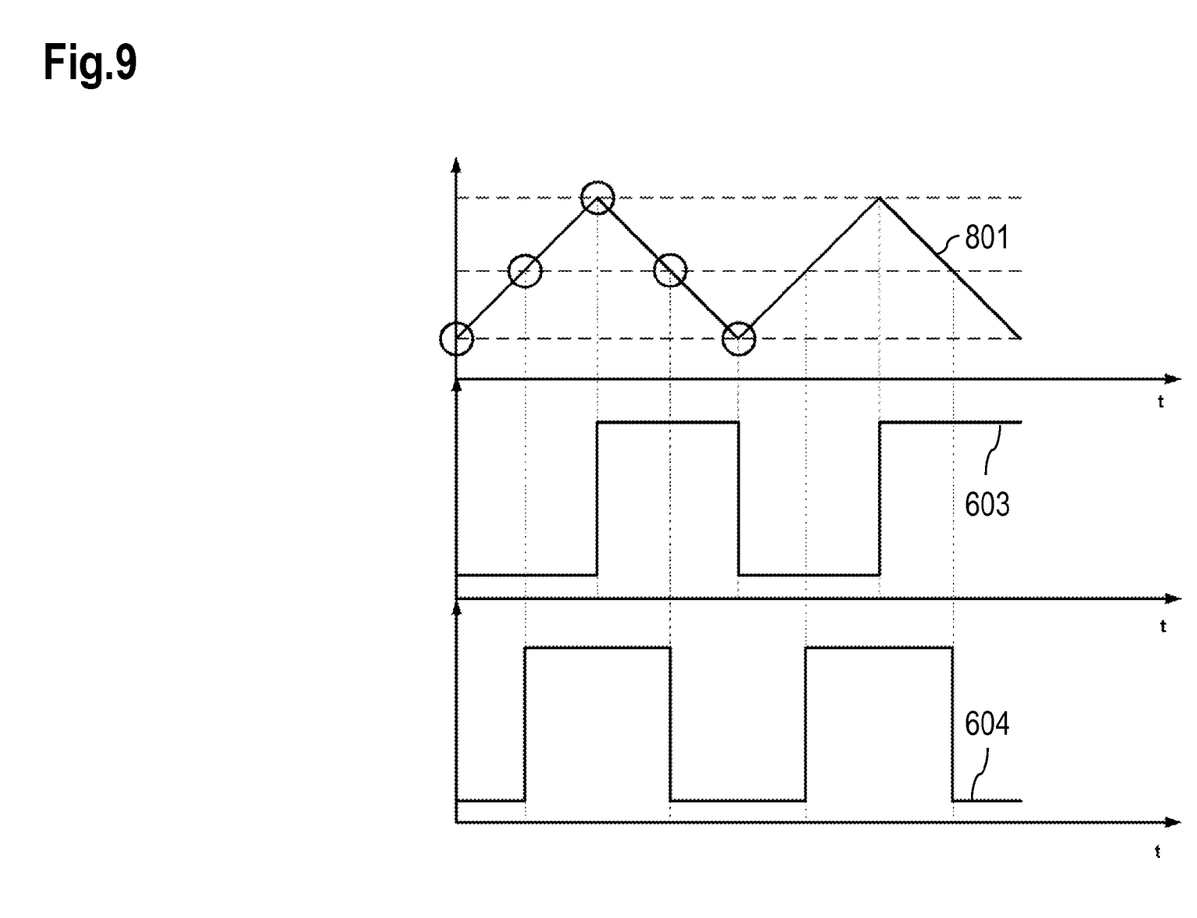
FIG. 9 shows a schematic diagram comprising rectangular signals of the Schmitt trigger and the balanced inverters based on the schematics of FIG. 7.

FIG. 9 shows a schematic diagram comprising rectangular signals of the Schmitt trigger and the inverter. Hence, FIG. 9 shows at the top the voltage signal 801 at the node 701 in view of the clock signal 603 and the clock signal 604.

FIG. 9 shows a 90°-phase shift between the inverted Schmitt trigger signal (clock signal 603) and the inverter generated signal (clock signal 604). These signals 603 and 604 are logically combined by the oscillator logic 602 to generate the overlapping clock sequence of the clock signals 605 and 606 as also shown in FIG. 3.

Oscillator Logic

Figure 10:
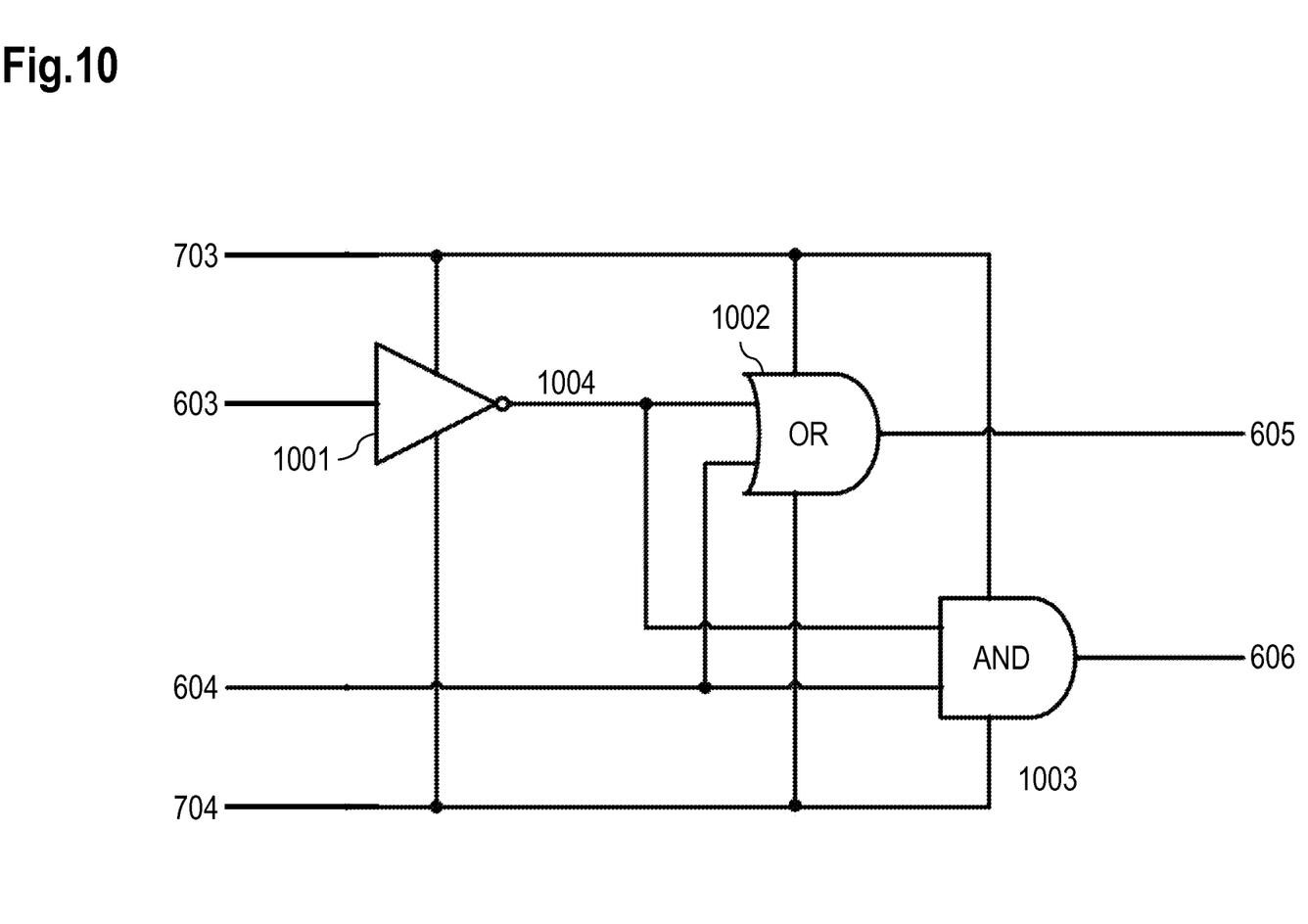
FIG. 10 shows a schematic circuit diagram of the oscillator logic as depicted in FIG. 6.

FIG. 10 shows a schematic circuit diagram of the oscillator logic 602. Signals from the nodes 703 and 704 are provided to the circuit of FIG. 10 as well as the clock signals 603 and 604. FIG. 10 also comprises an inverter 1001, an OR gate 1002 and an AND gate 1003. The inverter 1001, the OR gate 1002 and the AND gate 1003 are supplied via connections to the nodes 703 (high supply) and 704 (low supply).

The clock signal 603 is fed to the inverter 1001, which supplies a signal 1004 via its output, which signal 1004 is fed to the first input of the OR gate 1002. The output of the OR gate supplies the clock signal 605.

The signal 1004 is also fed to the first input of the AND gate 1003. The clock signal 604 is conveyed to the second input of the OR gate 1002 and to the second input of the AND gate 1003. The output of the AND gate 1003 supplies the clock signal 606.

Hence, the intermediate clock signals 603 and 604 are logically combined to generate an overlapping clock sequence comprising the clock signals 605 and 606, which allows using the bipolar transistors as shown in FIG. 4 instead of high voltage transistors.

Figure 11:
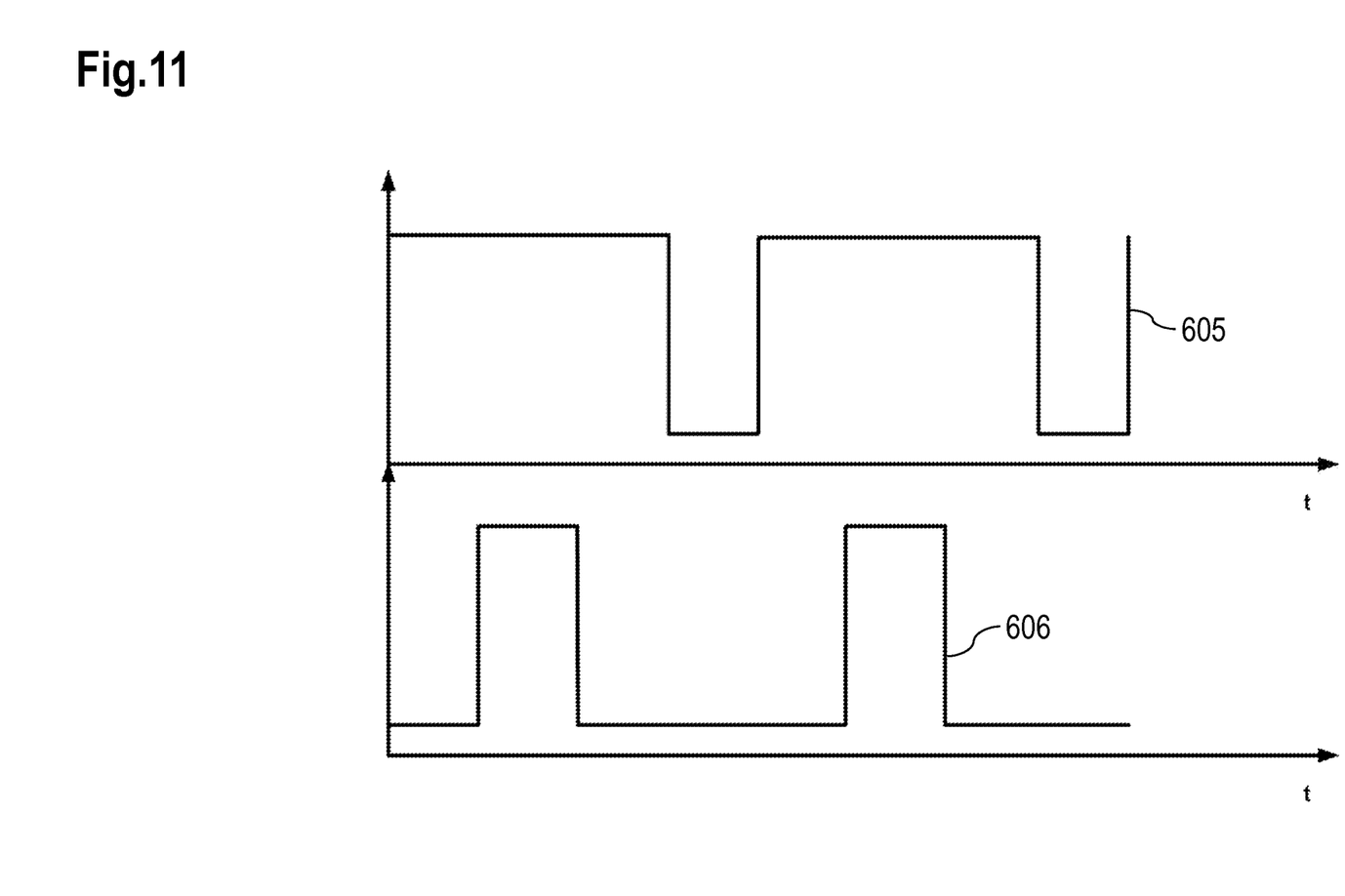
FIG. 11 shows a signal diagram comprising the clock signals provided by the circuit of FIG. 10 derived from the signals depicted in FIG. 9.

FIG. 11 shows a signal diagram comprising the clock signals 605 and 606 provided by the circuit of FIG. 10 derived from the signals depicted in FIG. 9.

Multi Branch Charge Pump

By modifying the oscillation logic 602, a different number of clocking sequences can be generated based on the intermediate clock signals 603 and 604.

Figure 12:
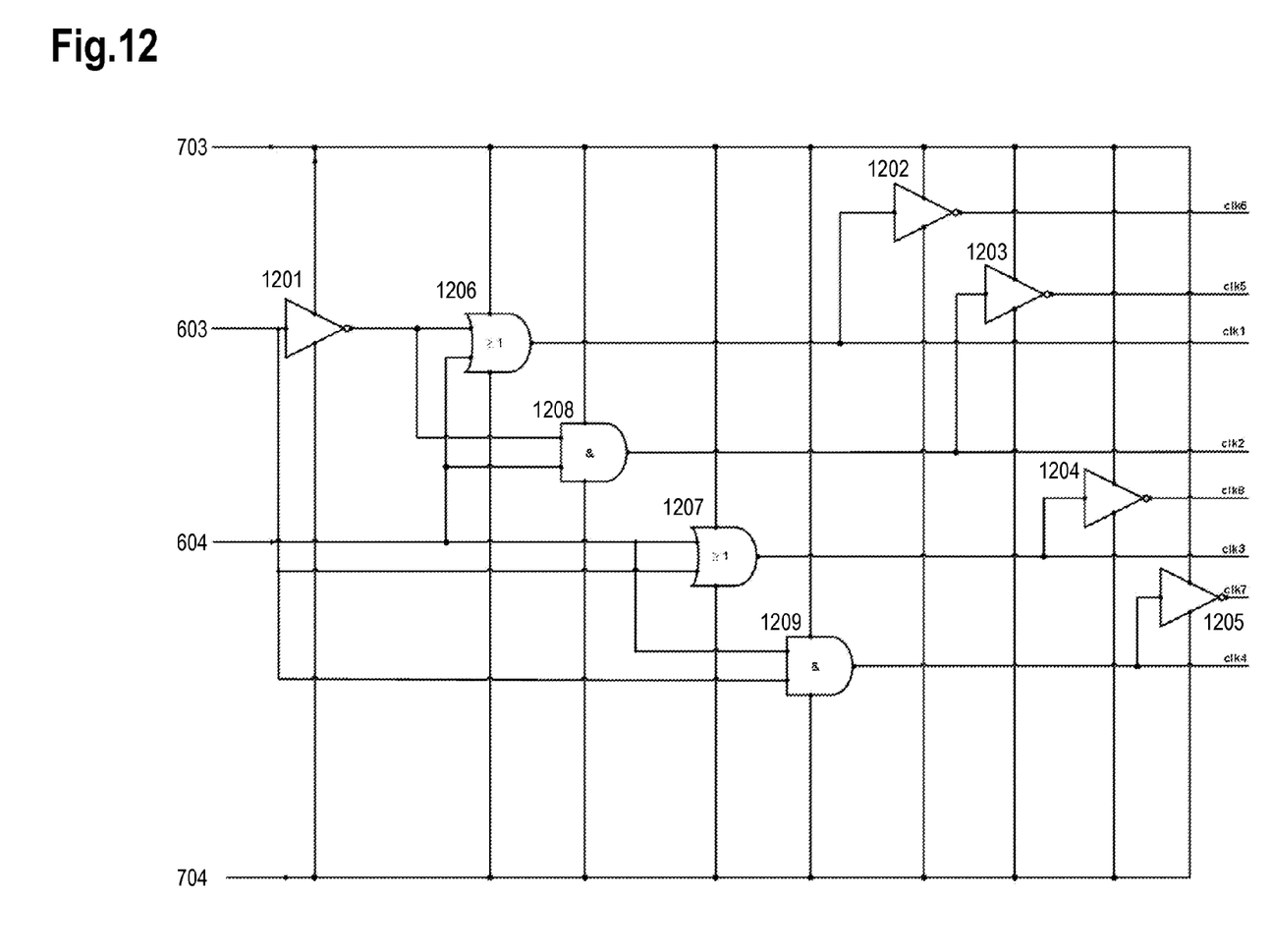
FIG. 12 shows an exemplary circuit diagram that allows generating eight different clocking sequences based on the intermediate clocking signals 603 and 604 shown in FIG. 6.

FIG. 12 shows an exemplary circuit diagram that allows generating eight different clocking sequences based on the intermediate clocking signals 603 and 604. According to FIG. 10, the signals from the nodes 703 and 704 are also supplied to the components of FIG. 12 as voltage supply lines.

FIG. 12 shows five inverters 1201 to 1205, two OR gates 1206 and 1207 and two AND gates 1208 and 1209.

The clock signal 603 is conveyed to the inverter 1201, to the second input of the OR gate 1207 and to the second input of the AND gate 1209. The clock signal 604 is conveyed to the first input of the OR gate 1207, to the first input of the AND gate 1209, to the second input of the OR gate 1206 and to the second input of the AND gate 1208.

The output of the inverter 1201 is connected to the first input of the OR gate 1206 and to the first input of the AND gate 1208.

The output of the OR gate 1206 supplies a clock signal clk1. The output of the OR gate 1206 is connected to the inverter 1202, which supplies a clock signal clk6 via its output.

The output of the AND gate 1208 supplies a clock signal clk2. The output of the AND gate 1208 is also connected to the inverter 1203, which supplies a clock signal clk5 via its output.

The output of the OR gate 1207 supplies a clock signal clk3. The output of the OR gate 1207 is connected to the inverter 1204, which supplies a clock signal clk8 via its output.

The output of the AND gate 1209 supplies a clock signal clk4. The output of the AND gate 1207 is also connected to the inverter 1205, which supplies a clock signal clk7 via its output.

This enables a multi branch charge pump. With eight clock signals four two stage charge pumps can be supplied. According to the embodiment presented, every single clock signal has a phase shift of 90° with regard to the previous clock signal.

An additional introduction of inverters that switch at different voltage levels of the RC transient allows generating $2^n+1$ clock signals based on n intermediate input signals. Hence, $2^n$ two-stage charge pump cores can be supplied.

Figure 13:
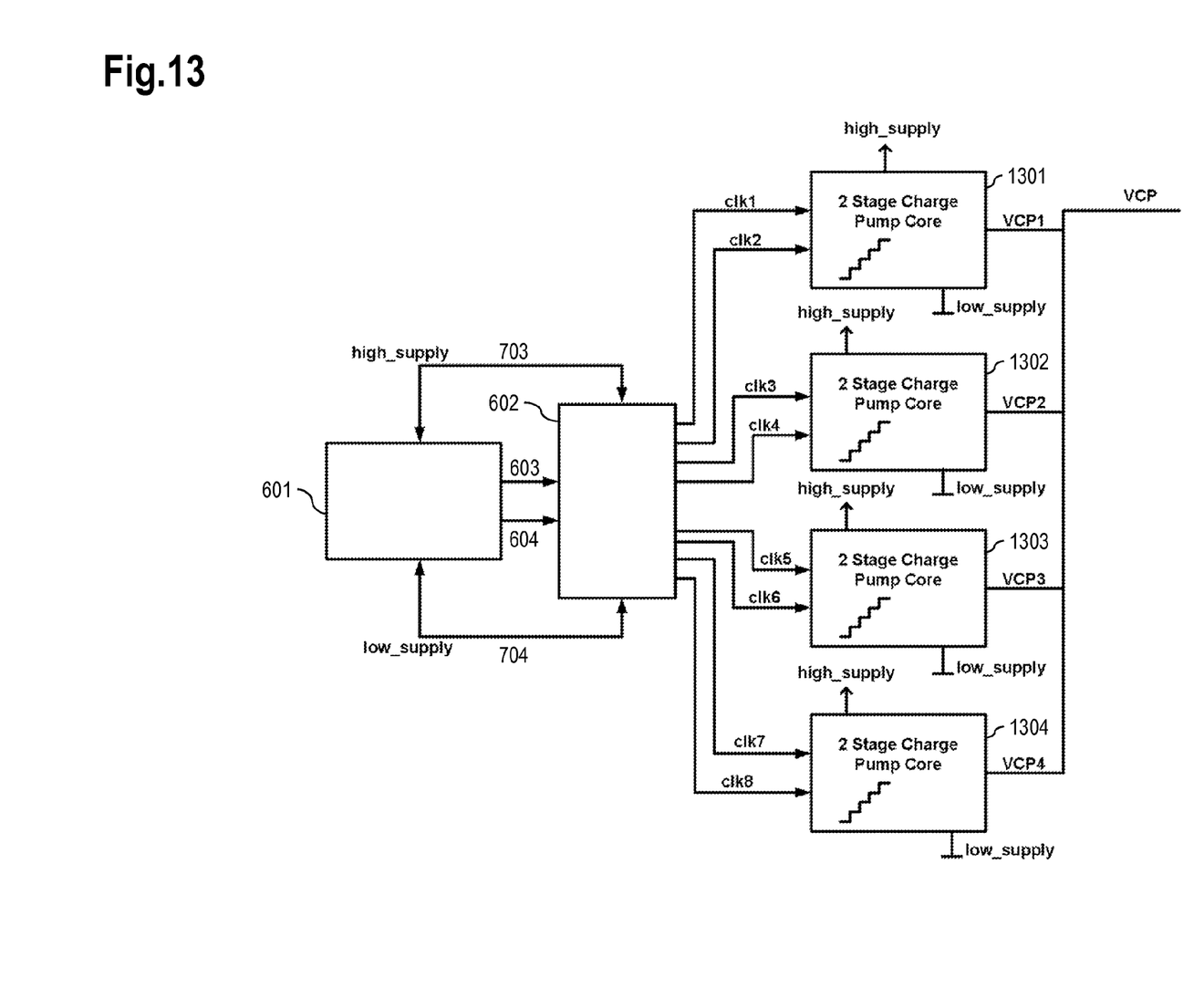
FIG. 13 shows a block diagram of an exemplary multi branch charge pump concept.

FIG. 13 shows a block diagram of an exemplary multi branch charge pump concept. The CSC oscillator 601 and the oscillator logic 602 are combined as explained above. As shown in FIG. 12, the oscillator logic 602 supplies eight clock signals clk1 to clk8. The clock signals clk1 and clk2 are fed to a two-stage charge pump core 1301 which provides an output signal VCP1. The clock signals clk3 and clk4 are fed to a two-stage charge pump core 1302 which provides an output signal VCP2. The clock signals clk5 and clk6 are fed to a two-stage charge pump core 1303 which provides an output signal VCP3. The clock signals clk7 and clk8 are fed to a two-stage charge pump core 1304 which provides an output signal VCP4.

The two-stage charge pump cores 1301 to 1304 are supplied via the nodes 703 and 704 (high supply and low supply). Also the output signals VCP1 to VCP4 are combined to an output signal VCP.

The multi branch charge pump with four charge pump cores as shown in FIG. 13 can advantageously overcome frequency limitation of a single charge pump core. The resulting frequency may be defined by the base frequency times the number of charge pump cores used. Hence, using four cores with frequency amounting to, e.g., 2.5 MHz each, an overall behavior can be achieved compared to a charge pump with a single core and a switching frequency amounting to 10 MHz. Another advantage of the multi branch charge pump concept is a reduced output ripple on the charge pump voltage.

The invention claimed is:

1. Circuitry comprising:
    a first charge pump stage controlled by a first control signal;
    a second charge pump stage controlled by a second control signal, wherein the second charge pump stage is arranged subsequent to the first charge pump stage; and
    a control unit for providing the first control signal and the second control signal, wherein the control unit is configured to limit a voltage drop across the first charge pump stage by setting the second control signal to high only when the first control signal is high, and wherein the voltage drop across the first charge pump stage is limited to a voltage of the first control signal.

2. The circuitry according to claim 1, wherein an input signal is fed to the first charge pump stage, and wherein the input signal is conveyed to the second charge pump stage via the first charge pump stage.

3. The circuitry according to claim 1, wherein the first charge pump stage and the second charge pump stage each comprises:
    a semiconductor element driven by the control signal of the respective stage, wherein the control signal of the respective stage is conveyed to the semiconductor element via a capacitor.

4. The circuitry according to claim 3, wherein the semiconductor element comprises at least one of the following:
    a transistor,
    a diode,
    a bipolar transistor,
    a MOSFET,
    a HVMOS transistor,
    an IGBT, or
    a field-effect transistor.

5. The circuitry according to claim 1, wherein the control unit comprises an oscillator and an oscillator logic.

6. The circuitry according to claim 5, wherein the oscillator is a current-source-capacitor oscillator comprising:
    a Schmitt trigger connected to a first inverter;
    a second inverter;
    a capacitor; and
    two current sources providing an output signal for charging and discharging the capacitor, wherein the output signal is fed to the Schmitt trigger and to the second inverter, wherein the Schmitt trigger drives the two current sources with the first inverter and provides a first intermediate signal, and wherein the second inverter provides a second intermediate signal.

7. The circuitry according to claim 6, wherein the first intermediate signal and the second intermediate signal are 90-degree phase shifted and are combined by the oscillator logic to provide the first control signal and the second control signal.

8. The circuitry according to claim 1, wherein the circuitry is a charge pump or a portion of a multi-branch charge pump.

9. A multi-branch charge pump comprising:
    at least two multi-stage charge pump cores, each of the charge pump cores comprising:
        a first charge pump stage controlled by a first control signal; and
        a second charge pump stage controlled by a second control signal, wherein the second charge pump stage is arranged subsequent to the first charge pump stage; and
    a control unit for providing the first control signal and the second control signal for each of the charge pump cores, wherein the control unit is configured to limit a voltage drop across the first charge pump stage of each charge pump core by setting the second control signal to high only when the first control signal is high, and wherein the voltage drop across the first charge pump stage of each charge pump core is limited to a voltage of the first control signal.

10. The multi-branch charge pump according to claim 9, wherein the control unit is configured to provide several control signals phase shifted by a predetermined amount, and wherein the control unit is further configured to provide two adjacent control signals as the first and second control signals to each of the at least two multi-stage charge pump cores.

11. The multi-branch charge pump according to claim 9, wherein the outputs of the at least two multi-stage charge pump cores are configured to generate a combined voltage output signal.

12. A method for controlling a charge pump, the method comprises:
    controlling a first charge pump stage with a first control signal; and
    controlling a second charge pump stage with a second control signal, wherein the second charge pump stage is arranged subsequent to the first charge pump stage, wherein controlling the second charge pump with the second control signal limits a voltage drop across the first charge pump stage to a voltage of the first control signal and comprises setting the second control signal to high only when the first control signal is set high.

13. The method according to claim 12, the method further comprising:
    setting the second control signal to high for a second duration while the first control signal is set to high for a first duration.

14. The method according to claim 13, wherein the first duration is longer than the second duration.

15. The method according to claim 13, wherein a middle of the first duration and a middle of the second duration occur at substantially the same time.

16. A system for controlling a charge pump, the system comprising:
    a first charge pump stage controlled by a first control signal;
    a second charge pump stage controlled by a second control signal, wherein the second charge pump stage is arranged subsequent to the first charge pump stage; and
    means for providing the first control signal and the second control signal, wherein the means for providing is configured to limit a voltage drop across the first charge pump stage by setting the second control signal to high only when the first control signal is set high, and wherein the voltage drop across the first charge pump stage is limited to a voltage of the first control signal.

17. The system of claim 16, further comprising:

means for setting the second control signal to high for a second duration while the first control signal is set to high for a first duration.

18. The system of claim 17, wherein a middle of the first duration and a middle of the second duration occur at substantially the same time.

* * * * *